United States Patent [19]

Hellard et al.

[11] Patent Number: 4,985,801

[45] Date of Patent: Jan. 15, 1991

[54] TUBE FOR THE CIRCULATION OF A FLAMMABLE FLUID, AND CONDUIT MADE FROM SUCH TUBES

[75] Inventors: Guy Hellard; Amour Bedes, both of Blagnac, France

[73] Assignee: Aerospatiale Societe Nationale Industrielle, Paris, France

[21] Appl. No.: 333,621

[22] PCT Filed: Jun. 30, 1988

[86] PCT No.: PCT/FR88/00349
§ 371 Date: Feb. 7, 1989
§ 102(e) Date: Feb. 7, 1989

[87] PCT Pub. No.: WO89/00263
PCT Pub. Date: Jan. 12, 1989

[30] Foreign Application Priority Data

Jul. 2, 1987 [FR] France .................. 87 09403

[51] Int. Cl.$^5$ .............................................. H05F 3/00
[52] U.S. Cl. .................. 361/215; 174/70 R; 174/78
[58] Field of Search ............... 174/68.1, 70 R, 74 R, 174/78; 361/212, 215

[56] References Cited

U.S. PATENT DOCUMENTS

| | | | |
|---|---|---|---|
| 1,516,422 | 11/1924 | Dallenbach | 138/42 |
| 3,828,112 | 8/1974 | Johansen et al. | 361/215 |
| 3,943,273 | 3/1976 | de Putter | 361/215 |
| 4,108,701 | 8/1978 | Stanley | 361/215 |
| 4,215,384 | 7/1980 | Elson | 174/78 |
| 4,654,747 | 3/1987 | Covey | 361/215 |
| 4,697,300 | 10/1987 | Warloq | 361/215 |

FOREIGN PATENT DOCUMENTS 1508758 4/1978 United Kingdom .

Primary Examiner—A. D. Pellinen
Assistant Examiner—Jeffrey A. Gaffin
Attorney, Agent, or Firm—Fisher, Christen & Sabol

[57] ABSTRACT

A tube for the circulation of a flammable fluid, adapted to be mounted in a structure, made at least partially of electrically insulating material, capable of being subjected to electrical disturbances of atmospheric origin. Tube (3) comprises two endpieces (5) for joining made of electrically conductive material and a body (6). Tube body (6), of which at least the inner surface is electrically conductive over the major part of its length, presents at least one electrically insulating section (10). The tube particularly applicable as fuel conduits for aircraft.

7 Claims, 3 Drawing Sheets

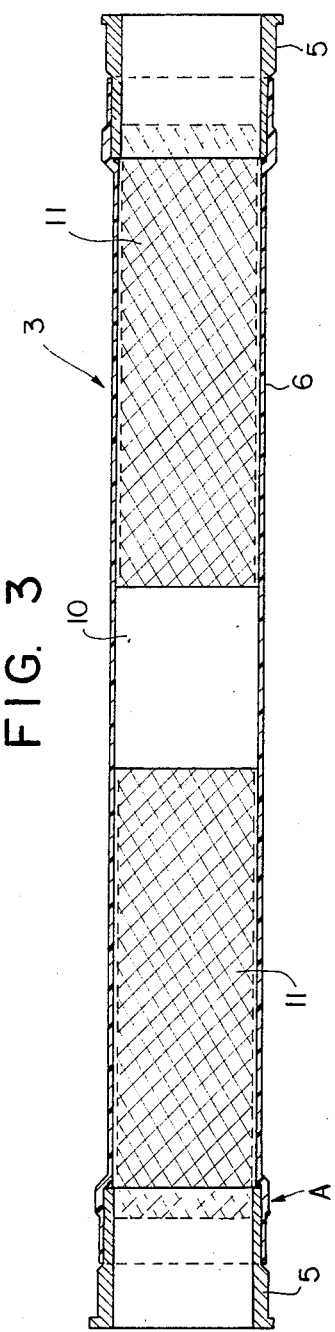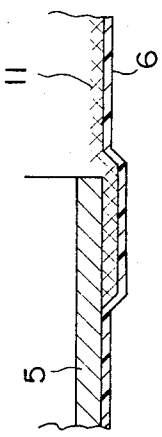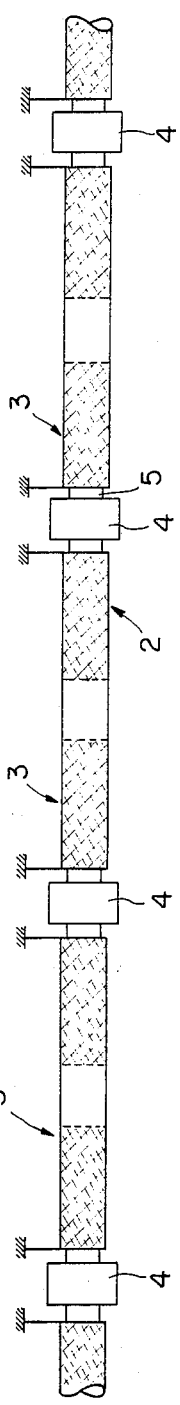
FIG. 3
FIG. 4
FIG. 5

TUBE FOR THE CIRCULATION OF A FLAMMABLE FLUID, AND CONDUIT MADE FROM SUCH TUBES

BACKGROUND OF THE INVENTION

1. Field of the Invention

The present invention relates to a tube for the circulation of a flammable fluid, as well as to a conduit made from such tubes.

2. Background Art

The invention is particularly, but not exclusively, applicable to the tubes for the circulation of fuel in aircraft of which numerous structures, such as the tanks, are made at least partially of insulating composite material.

When a metallic fuel circuit is installed in a totally or partially insulating structure, such as a fuel tank made of composite material, and when said structure is struck by lightning, a considerable current of lightning risks circulating in the conduit which is a better conductor of electricity than the surrounding structure. This phenomenon presents considerable risks due to overheating or to sparks which may be produced at the different joints between conduit elements, during passage of the current.

Furthermore, the conduit of the fuel circuit must satisfy two requirements. The first is that of withstanding the mechanical efforts produced by the fuel or the deformations of the structure in which it is mounted. The second is that of evacuating the static electricity created by the circulation of the fuel - electrically insulating - at high speed in the conduit. These two functions are generally ensured when the tube is made of metal, which, on the other hand, presents, as has been seen hereinabove, risks in the event of the aircraft being struck by lightning.

BROAD DESCRIPTION OF THE INVENTION

It is an object of the invention to avoid these drawbacks, and it relates to a tube for the circulation of a flammable fluid, such as fuel, of which the design makes it possible to prevent the currents of lightning from circulating in the conduits made from said tubes, while making it possible to bleed off the static electricity, generated by the circulation of the fuel, towards the conductive zones of the tank, and respecting the mechanical stresses connected with the circulation of the fuel or with the deformations of the structure in which said tubes are mounted.

To that end, the tube for the circulation of a flammable fluid, adapted to be mounted in a structure, made at least partially of electrically insulating material, capable of being subjected to electrical disturbances of atmospheric origin, said tube comprising two endpieces for joining of electrically conductive material and a body, is noteworthy, according to the invention, in that the tube body, of which at least the inner face is electrically conductive over the major part of its length, presents at least one electrically insulating section.

In this way, the invention creates, in the tube, at least one local non-conductive zone, which avoids the conduit for circulation of the flammable fluid, particularly fuel, constituting a continuous conductor for the currents of lightning. Furthermore, the major part of the tube is conductive and may be connected to the conductive zones of the structure, or of an adjacent structure, to bleed off the static electricity.

According to a first embodiment of the invention, the tube body is made of an electrically insulating material, and the inner face of said body comprises two electrically conductive elements, separate from and connected to said endpieces, respectively.

In particular, said conductive elements are disposed symmetrically with respect to an electrically insulating, central section of the body of the tube.

According to a second embodiment of the invention, the tube body is constituted by two end sections made of electrically conductive material and connected to an electrically insulating, intermediate section.

In particular, said intermediate section is constituted by two insulating sleeves, of which one is disposed inside said end sections, and the other, outside.

According to other features of the invention, said electrically insulating material is a composite material, and the parts of said tube made of electrically conductive material are grounded.

BRIEF DESCRIPTION OF THE DRAWINGS

The Figures of the accompanying drawing clearly show how the invention can be carried out. In these Figures, identical references designate like elements.

FIG. 3 is a view in longitudinal section of a first embodiment of the tube according to the invention.

FIG. 4 is an enlarged view of detail A of FIG. 3.

FIG. 5 illustrates an assembly of tubes of FIG. 3.

DETAILED DESCRIPTION OF THE INVENTION

In box element 1 forming, for example, a fuel tank of an aircraft, there is mounted a conduit 2 of the fuel circuit, constituted by a plurality of elementary tubes 3 connected to one another by joints 4.

Figure 1:
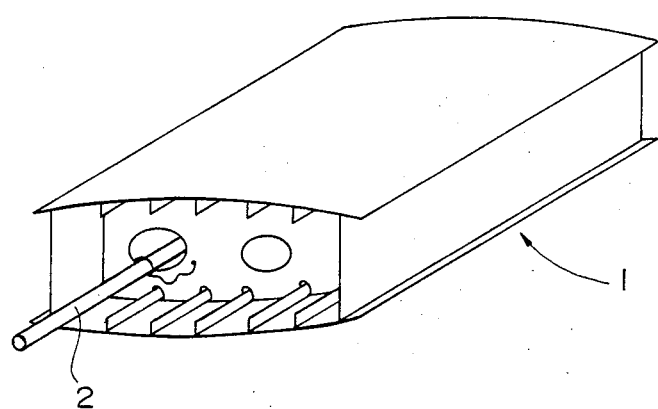
FIG. 1 is a schematic view in perspective of a box element made of composite material forming fuel tank for example of an aircraft.
Figure 2:
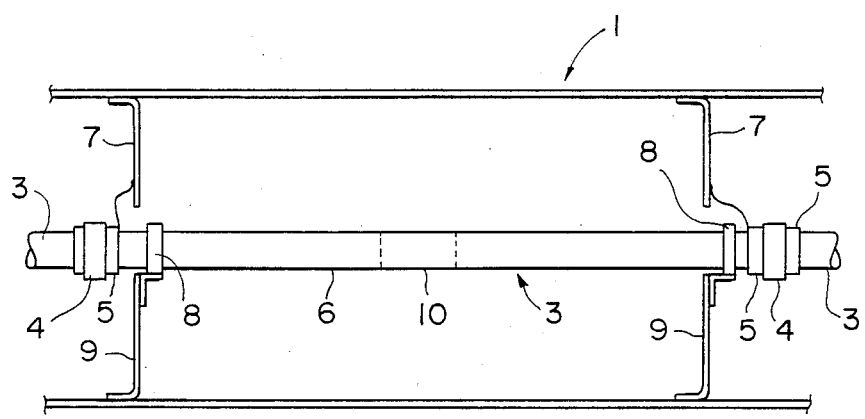
FIG. 2 is a schematic partial view in section of the box element of FIG. 1.

Referring to FIG. 2, tube 3 comprises two metal endpieces 5 and a body 6. Metal endpieces 5 are each connected to conductive members 7 of box element 1 and, similarly, connection flanges 8 of tube 3 are connected to conductive supports 9.

Body 6 of the tube, of which at least the inner face is electrically conductive over the major part of its length, presents an electrically insulating section 10, as explained in greater detail hereinbelow with reference to FIGS. 3 to 7 illustrating two embodiments of the tube of the invention. It will be noted that an external metallization may be provided on box element 1.

With reference to FIGS. 3 to 5 illustrating a first embodiment of the tube according to the invention, body 6 of tube is made of insulating, resistant, composite material, from fibers impregnated with resin (fibers: glass, aramides or the like resin epoxy, phenolic, polyester, bismaleimide or the like).

Tube body 6 performs the function of resistance to mechanical efforts. It terminates, at each end, in a metal endpiece 5 which makes it possible to use all the known systems of joining conduits for the circulation of fuel.

The static electricity is bled off by electrically conductive elements 11 placed on the inner surface of the tube, i.e., the surface in contact with the fuel which circulates at high speed. Each conductive element 11, which may be constituted by a metal netting, a metal foil, a deposit of metal, a network of wires or a spiral wire, is electrically connected to a respective metal endpiece 5 either by simple contact or by crimping or welding (FIG. 4).

Conductive elements 11 are separate from one another, this making it possible to conserve an insulating central section 10 of tube body 6. The length of this section will be determined as a function of two criteria. The non-conductive length must be sufficient to avoid the appearance of discharge arcs. In fact, certain lightning conditions may bring about considerable differences in potential between the two conductive elements. Furthermore, this distance must be fairly short in order not to produce dangerous phenomena connected with the presence of static charges.

In this way, the static electricity is bled off over major part of conduit 2 of the fuel circulation circuit, and evacuation of the static charges is ensured by grounding each endpiece 5 (FIG. 5). The space between conductive elements 11 in the central zone of each tube 3 prevents the fuel circulation circuit from behaving like a continuous electrical conductor bleeding off currents of high intensity, such as that of lightning.

The tube according to this first embodiment of the invention may be manufactured in the following manner.

The two metal endpieces which have undergone the appropriate surface treatments for adhesion and protection against corrosion, are placed on a mandrel. Each metallic conductive element is then disposed so that it partially covers the corresponding endpiece.

The composite material, constituted by fibers impregnated with resin, is then deposited either in the form of crossed unidirectional laps, or in the form of fabrics, wound over the mandrel assembly, or by winding a yarn or a lap of small width. The use of a mat of fibers (non-aligned fibers) impregnated upon laying is also possible. A partial covering of the endpiece by the end of the tube body of composite material makes it possible to ensure, by adhesion, the transfer of the mechanical efforts between the tube body and the endpieces.

Of course, the number of layers deposited and their orientation depend on the mechanical efforts to hold.

The assembly is then polymerized and hardening of the resin of the composite material and adhesion of the tube body on the endpieces, are obtained in the same operation.

The use of a high performance composite material makes it possible to produce a resistant conduit lighter than those made of metal. The choice of a fiber with low modulus of elasticity further makes it possible to produce a supple conduit which follows the deformations of the structure in which it is mounted. Furthermore, the partial metallization of the inner face of the tube body allows the static electricity generated in the fuel to be bled off whilst avoiding the fuel circulation circuit offering a privileged path for the lightning currents.

Figure 6:
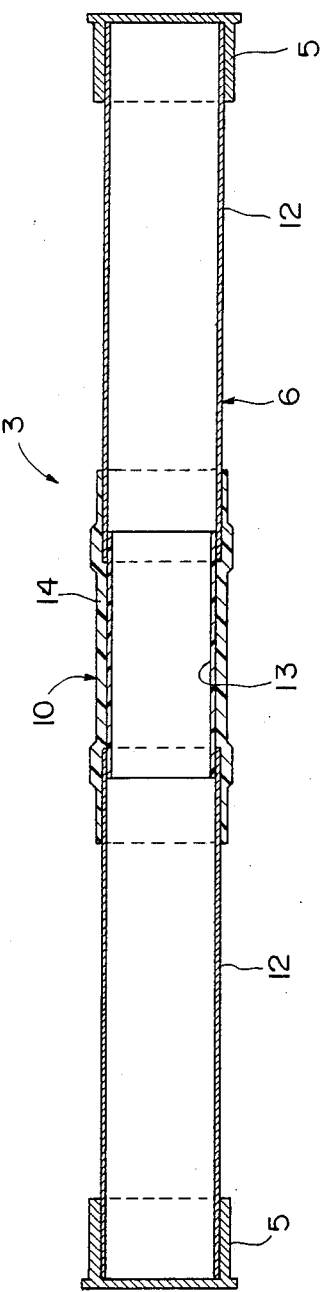
FIG. 6 is a view in longitudinal section of a second embodiment of the tube according to the invention.
Figure 7:
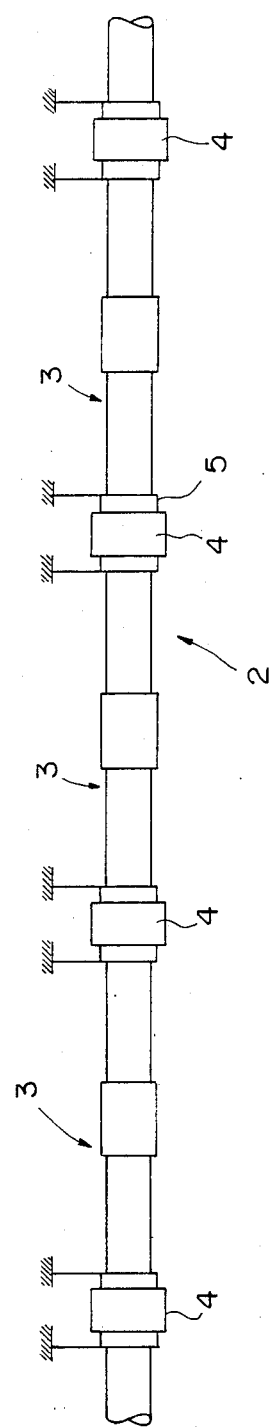
FIG. 7 illustrates an assembly of tubes of FIG. 6.

Referring to FIGS. 6 and 7 illustrating a second embodiment of the invention, the tube is constituted by:

two metal endpieces 5 which allow tube 3 to be joined to adjacent tubes, two metal end sections 12, welded to, crimped or integrated in metal endpieces 5, and an intermediate section 10 made of insulating, resistant composite material, which may be a material such as those indicated hereinabove.

Intermediate section 10 is constituted by an inner sleeve 13 made of insulating composite material, previously polymerized, which fits in the two end sections, and by an outer sleeve 14, likewise made of insulating composite material, which covers inner sleeve 13 and, partially, the two metal end sections 12.

This design, of reduced manufacturing cost, also satisfies the requirements demanded for the fuel circuit: tightness, resistance, protection against lightning, bleeding off of the static electricity.

What is claimed is:

1. In a hose construction having an inside surface defining a passage for conveying a flammable fluid and a pair of hose connectors connected to opposed end portions of said hose construction, said hose connectors being in an electrically conductive material in order to be grounded, the improvement being in that said inside surface comprises:

a first electrically conductive portion electrically connected to one of said hose connectors;

a second electrically conductive portion electrically connected to the other of said hose connectors; and an intermediate electrically insulating portion disposed between said first and second electrically conductive portions and electrically insulating said first electrically conductive portion from said second electrically conductive portion.

2. The hose construction of claim 1 wherein said hose construction is made of an electrically insulating material so that said inside surface is electrically insulating, said first and second electrically conductive portions being made by electrically conductive layers separated from each other and covering the opposed end portions of said inside surface.

3. The hose construction of claim 2 wherein said electrically insulating material is a composite material.

4. The hose construction of claim 2 wherein said electrically conductive layers are disposed symmetrically with respect to said intermediate electrically insulating portion.

5. The hose construction of claim 1 wherein said hose construction is made of two electrically conductive end sections connected by an intermediate electrically insulating section.

6. The hose construction of claim 5 wherein said intermediate electrically insulating section is made of a composite material.

7. The hose construction of claim 5 wherein said intermediate electrically insulating section is made of an inside electrically insulating sleeve and an outside electrically insulating sleeve.

* * * * *